United States Patent
Barsness et al.

(10) Patent No.: US 8,671,418 B2
(45) Date of Patent: Mar. 11, 2014

(54) ENVIRONMENT MODIFICATION IN A HYBRID NODE COMPUTING ENVIRONMENT

(75) Inventors: Eric L. Barsness, Pine Island, MN (US); David L. Darrington, Rochester, MN (US); Amanda Peters, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1166 days.

(21) Appl. No.: 12/368,398

(22) Filed: Feb. 10, 2009

(65) Prior Publication Data
US 2010/0205619 A1  Aug. 12, 2010

(51) Int. Cl.
*G06F 3/00* (2006.01)
(52) U.S. Cl.
USPC .......................................................... 719/331
(58) Field of Classification Search
None
See application file for complete search history.

(56) References Cited

U.S. PATENT DOCUMENTS

| | | | |
|---|---|---|---|
| 5,870,619 A * | 2/1999 | Wilkinson et al. | 712/20 |
| 2001/0034860 A1* | 10/2001 | Phillips | 714/42 |
| 2003/0115580 A1* | 6/2003 | Arai et al. | 717/158 |
| 2005/0193184 A1* | 9/2005 | Kohno et al. | 712/1 |
| 2006/0010449 A1* | 1/2006 | Flower et al. | 718/102 |

\* cited by examiner

*Primary Examiner* — H S Sough
*Assistant Examiner* — Carina Yun
(74) *Attorney, Agent, or Firm* — Patterson & Sheridan LLP

(57) ABSTRACT

Embodiments of the invention provide techniques that improve resource management on a massively parallel computing system having a plurality of hybrid compute nodes. For example, a job scheduler may be provided which determines a library to link to an application based on system and user requirements. In one embodiment, the libraries may provide optimizations for job execution time, and also provide optimizations directed towards a specific processor architecture. Once the library is determined, the job scheduler may configure the environment of the application so that the application links with the optimized library during run-time. Doing so may improve overall system performance of the massively parallel computing system.

23 Claims, 4 Drawing Sheets

ENVIRONMENT MODIFICATION IN A HYBRID NODE COMPUTING ENVIRONMENT

BACKGROUND OF THE INVENTION

1. Field of the Invention

Embodiments of the invention generally relate to improving system utilization on a massively parallel computer system. More specifically, embodiments of the invention relate to altering the run-time characteristics of a computing job to meet system and user requirements.

2. Description of the Related Art

Powerful computers may be designed as highly parallel systems where the processing activity of thousands of processors (CPUs) is coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) for the Los Alamos National Laboratory (LANL) under the project name Roadrunner. The architecture of a computing system similar to that of provided to LANL provides a scalable, parallel computer that may be configured with a maximum of 3240 compute nodes. Each compute node may include two general purpose processors, four special purpose processors and memory. Thus, such a computing system may include 6480 general purpose processors and 12960 special purpose processors. The architecture has been successful and on May 25, 2008, IBM announced that such a system had reached an operational speed just over 1.026 petaflops (1026 trillion floating-point operations per second), making it the fastest computer in the world at that time.

SUMMARY OF THE INVENTION

One embodiment of the invention provides a method for configuring an environment in a multi-node system having a plurality of hybrid compute nodes, each having at least a processor and a memory. The method generally includes evaluating a job profile associated with the computing job, wherein the job profile specifies expected performance characteristics of the computing job for one or more different configurations of the computing environment, determining, based on the evaluation of the job profile, one or more libraries for the computing job to link to when the computing job is executed by at least some of the plurality of compute nodes, and configuring the computing environment such that the job accesses routines from the determined libraries.

Another embodiment of the invention provides a computer-readable storage-medium containing a program which, when executed, performs an operation for configuring a computing environment to execute a computing job. The operation generally includes evaluating a job profile associated with the computing job, wherein the job profile specifies expected performance characteristics of the computing job for one or more different configurations of the computing environment, determining, based on the evaluation of the job profile, one or more libraries for the computing job to link to when the computing job is executed by at least some of the plurality of compute nodes, and configuring the computing environment such that the computing job accesses routines from the determined libraries.

Yet another embodiment of the invention provides computing system. The computing system generally includes a computing environment and a job scheduler. The computing environment generally includes a plurality of compute nodes, each including at least a processor and a memory, and wherein at least one of the compute nodes further includes an accelerator processor. The job scheduler is generally configured to select a computing job to execute on at least some of the plurality of compute nodes, wherein the job scheduler is configured to perform an operation for configuring the computing environment to execute the computing job. The operation of the job scheduler generally includes evaluating a job profile associated with the computing job, wherein the job profile specifies expected performance characteristics of the computing job for one or more different configurations of the computing environment, determining, based on the evaluation of the job profile, one or more libraries for the computing job to link to when the computing job is executed by at least some of the plurality of compute nodes, and configuring the computing environment such that the job accesses routines from the determined libraries.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
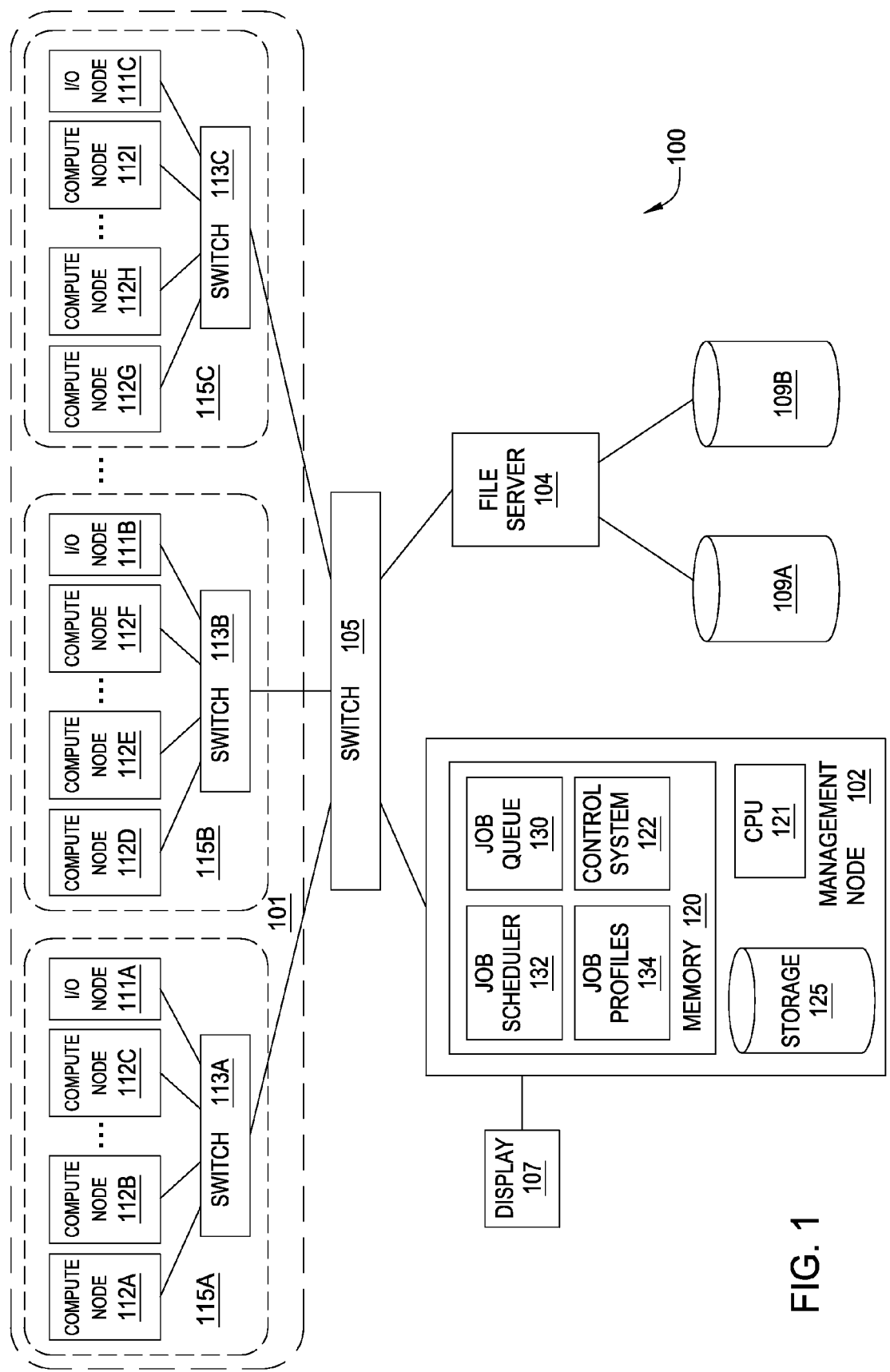
FIG. 1 is a block diagram illustrating components of a massively parallel computer system, according to one embodiment of the present invention.

Embodiments of the invention provide techniques to manage resources on a massively parallel computing system having a plurality of hybrid compute nodes. For example, a job scheduler may determine one or more libraries to link to an application, based on system and user requirements. In one embodiment, the libraries may provide optimizations directed towards a specific processor architecture. Once the appropriate library is determined, the job scheduler may configure a computing environment for the application so that the application links with the optimized library during run-time. Doing so may improve overall system performance of the massively parallel computing system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating components of a massively parallel computer system 100, according to one embodiment of the present invention. Illustratively, computer system 100 shows the high-level architecture of a computer system similar to that of provided to LANL, it being understood that other parallel computer systems could be used, and the description of a preferred embodiment herein is not intended to limit the present invention.

As shown, computer system 100 includes a compute core 101 having a plurality of compute nodes 112. Compute nodes 112 perform the useful work performed by system 100. The operation of computer system 100, including compute core 101, may be controlled by management node 102. A first network switch 105 provides the primary data communication path among compute core 101 and other system components. For example, data stored in storage devices 109A, 109B attached to a file server 104 may be loaded and stored to other system components through the first network switch 105.

Also as shown, compute core 101 includes I/O nodes 111A-C and compute nodes 112A-I. Compute nodes 112 provide the processing capacity of parallel system 100, and are configured to execute applications written for parallel processing. In one embodiment, each of the compute nodes 112 may comprise of a hybrid architecture, where processors having different processor architectures are used in conjunction to perform operations. For example, one processor architecture may be used for general purposes (i.e. a general purpose processor), while another processor architecture may contain accelerator elements that are dedicated for performing mathematically-complex operations (i.e. a special purpose processor), such as vector processing. The hybrid architecture of the compute nodes 112 is further described in FIG. 2.

I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a connecting unit (CU). As shown, compute core 101 contains M CU's 115A-C, each including an I/O node 111 and N compute nodes 112, for a total of M×N compute nodes 112. For illustrative purposes, FIG. 1 shows a CU having only a single I/O node. However, the number of I/O nodes may change according to the needs of a particular application.

In general, application programming code and other data input required by compute core 101 to execute user applications, as well as data output produced by the compute core 101, is communicated over the first network switch 105. The compute nodes within a CU 115 communicate with each other and with the corresponding I/O node(s) over a second network switch 113A-C. The compute nodes 112 and the I/O nodes, in turn, are connected to the first network switch 105, over which they communicate with I/O devices attached to file servers 104, or with other system components (such as other CU's). Thus, the second network switch 113 may be viewed logically as extensions of the first network switch 105, and are used for data I/O. In one embodiment, the first network switch 105 and the second network switch 113A-C may support any type of proprietary or industry standard I/O protocol, such as Infiniband, Gigabit Ethernet, FibreChannel, PCI-Express, or any other past or future I/O protocols.

The management node 102 may be configured to direct the operation of the compute nodes 112 in compute core 101. In one embodiment, management node 102 is a computer system that includes a processor (or processors) 121, internal memory 120, and local storage 125. An attached console 107 (i.e., a keyboard, mouse, and display) may be used to initialize computing jobs on compute core 101. Management node 102 may also include an internal database which maintains state information for the compute nodes in core 101. Illustratively, memory 120 also includes a control system 122. In one embodiment, control system 122 may be a software application configured to control the allocation of compute nodes 112 in compute core 101, direct the loading of application and data on compute nodes 111, and perform diagnostic and maintenance functions, among other things.

As shown, memory 120 also includes a job queue 130 and a job scheduler 132. The job queue 130 may store a plurality of jobs that await execution in the compute core 101. In one embodiment, a job may be a command to execute an application to be run on one or more compute nodes 112. When a job is ready for execution, the job scheduler 132 may select the job from the job queue 130 and transmit the job to the compute core 101.

In one embodiment, the job scheduler 132 may also configure an environment in which an application runs. For example, the job scheduler 132 may modify environment variables indicating which libraries an application should link to during run-time and specify paths for such libraries e.g., shared-object libraries. Similarly, the job scheduler may define a variety of environment variables for use by the application.

In one embodiment, a library may contain subroutines and data optimized for a given processor architecture. Therefore, in a system where multiple processor architectures are used, such as a hybrid architecture, different versions of a library may be provided. For example, one version of the library may be optimized for a general purpose processor, while another version of the library may be optimized for a special purpose processor. While different versions of a library may be optimized for different architectures, the functionality provided by the routines linked to by different versions of a library is fundamentally the same. That is, while each library provides the same set of routines, the implementations of a given routine may be tailored for different computing architectures. This allows a specialized version of a library (or routine in a library) to take advantage of specialized hardware (e.g., a special purpose processor such as a vector-based cell processor).

In another embodiment, optimized libraries that improve the execution time (i.e. performance-critical libraries) of an application may be provided. In this case, an application using a performance-critical version of a library may allocate more compute nodes for execution than a non-optimized version of the library. Doing so may improve compute node utilization (and the utilization of other computing resources) may result in a faster execution time.

By configuring which libraries an application links to, the job scheduler 132 may, in effect, determine the type of processing elements that are used by the application during run time. To determine which libraries should be linked with the application, the job scheduler may monitor the resource usage of the compute core 101, and also evaluate historical information regarding the application. The historical information may be stored as job profiles in memory 120.

Accordingly, memory 120 is shown including job profiles 134. The job profiles 134 may maintain a history of application runs previously executed in the compute core 101. The job profiles 134 may also store run-time characteristics for each application run in the job profiles 134. Such run-time characteristics may include execution times for the application, libraries used when executing the application, compute resources (i.e. memory and CPU usage) consumed when executing the application, and the compute node(s) 112 used to execute the application. In one embodiment, for example, in a hybrid architecture, the job profiles 134 may also store the type of processor used to execute the application and the number of accelerator elements used for the application.

Over any given period, an application may be executed more than once in the compute core 101, and the run-time characteristics associated with each execution of the application may vary. For example, the execution time for one instance of an application run may be faster compared to another instance of an application run. In another case, the compute node(s) 112 and/or type of processor of the compute node(s) 112 used to execute the application may also vary. Accordingly, the job profiles 134 may store these run-time characteristics for each instance of an application run. Thus, the job profiles 134 may provide information regarding an application's behavior (and effectiveness) on a given node (or nodes) and on a given processor architecture, along with the libraries used during an application run.

As stated above, the job scheduler 132 may determine what libraries an application links to using the job profiles 134 and also by monitoring resource usage in the compute core 101. For example, the job scheduler 132 may compare job profiles of an application and determine that the application runs more efficiently on a special purpose processor as opposed to a general purpose processor (e.g. the execution times are faster on a special purpose processor for the application). In this case, the job scheduler 132 may schedule the execution of the application on a special purpose processor during subsequent runs. In one embodiment, the job scheduler 132 may also configure the environment so that the application links to a library optimized for that particular processor architecture. Details regarding the linking process between an application and a library are further discussed in FIGS. 4A-4B.

In some cases, compute nodes with a special purpose processor may be busy processing some other application. In this case, the job scheduler 132 may either wait for a compute node with a special purpose processor to become available, or alternatively schedule the execution of the application on a general purpose processor (assuming that there are general purpose processors available). Further, regardless of the processor selected for execution, the job scheduler 132 may optimize the resources of the system 100 as a whole.

In another embodiment, the job scheduler 132 may also incorporate user input when determining an execution environment for the application. For example, suppose a user specifies that an application should execute within a predetermined amount of time. In this case, the job scheduler 132 may examine the job profiles 134 for the application and find a profile which resulted in the application finishing less than the predetermined amount of time. Once the job scheduler 132 finds such a profile, the job scheduler 132 may schedule the application to be executed using the characteristics provided by the profile. For example, the characteristics may have indicated that the application was executed using a performance-critical library and also that an N number of compute nodes 112 were allocated when the application was executed. Accordingly, when scheduling to run the application, the job scheduler 132 may first determine if at least N compute nodes 112 are currently available. If so, then the job scheduler 132 may modify the computing environment so that a performance-critical library that the application should link to the performance-critical library during run-time.

Figure 2:
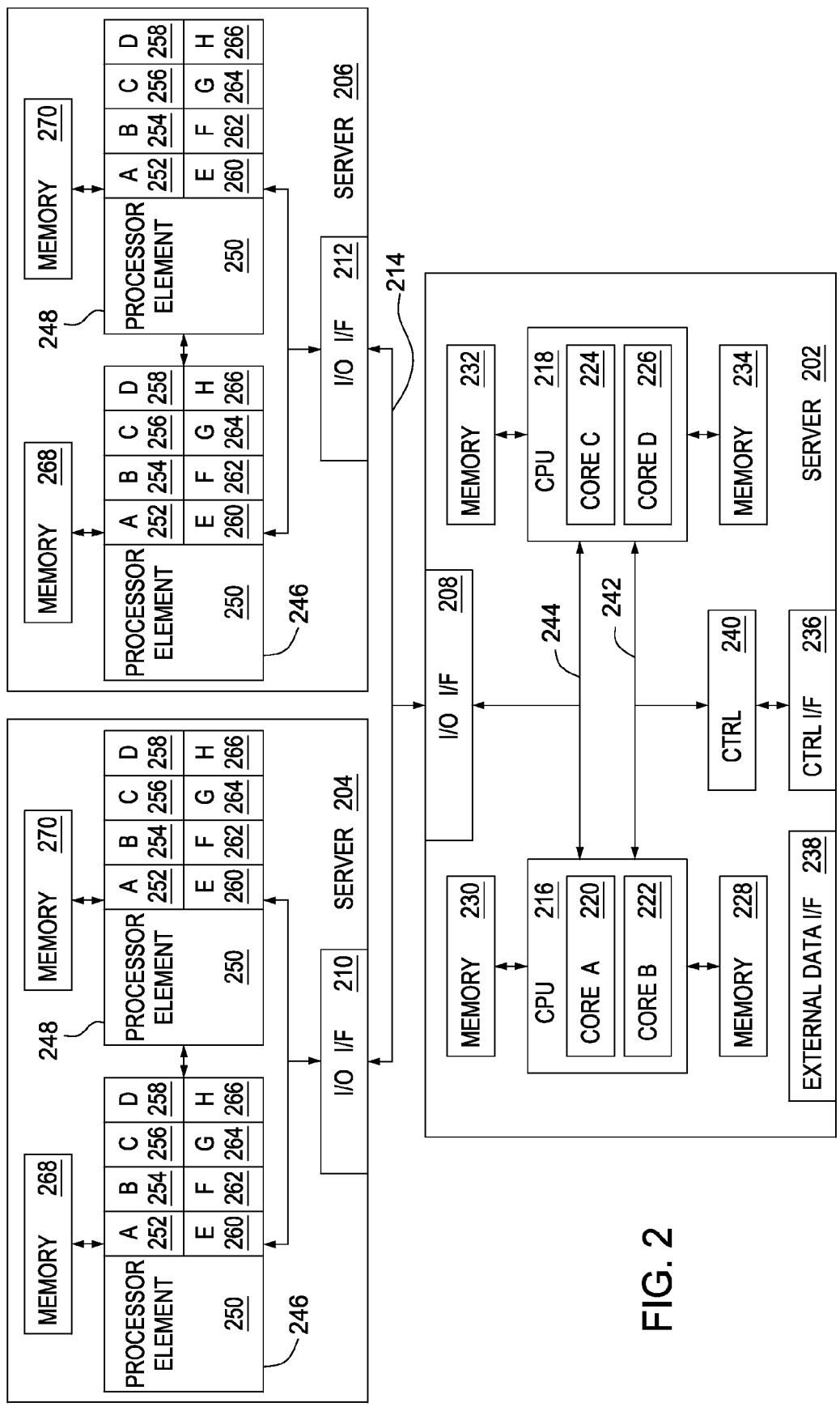
FIG. 2 is a block diagram of a hybrid compute node of the system of FIG. 1, according to one embodiment of the invention.

FIG. 2 is a block diagram of a hybrid compute node 112 of the system of FIG. 1, according to one embodiment of the invention. As shown, a compute node 112 may comprise of a plurality of servers 202, 204, 206. In one embodiment, each of the servers 202, 204, 206 may be a blade server (i.e. a server designed to fit on a small plug-and-play card or board that can be installed in a rack, side-by-side with other blade servers). As shown, the servers 202, 204, 206 may be communicatively coupled via a high-speed bus 214. Accordingly, each server 202, 204, 206 may include an input/output (I/O) interface 208, 210, 212 to connect to the high-speed bus 214. In one embodiment, each I/O interface 208, 210, 212 may support any type of proprietary or industry standard I/O protocol, such as Infiniband, Gigabit Ethernet, FibreChannel, PCI-Express, or any other past or future I/O protocols.

As shown, server 202 includes two processors 216, 218, each having two processing cores 220 (Core A), 222 (Core B), 224 (Core C), 226 (Core D). In one embodiment, each processor 216, 218 may be a general purpose processor. The general purpose processors 216, 218, may perform operations such as transferring data to the other servers 204, 206 (via control bus 244), other compute nodes 112, and also execute applications (or portions of applications) which do not require mathematically intensive operations. As shown, processors 216, 218 may also transfer data between each other via control bus 244. Server 202 may also include memory 228, 230, 232, 234. As shown, each processing core 220, 222, 224, 226 may have a dedicated memory 228, 230, 232, 234. For example, processing core A (220) may use memory 230, processing core B (222) may use memory 228, processing core C (224) may use memory 232, and processing core D (226) may use memory 234. However, in other embodiments, it is possible to have different memory organizations. For example, server 202 may include a memory which is shared by all processing cores 220, 222, 224, 226.

Server 202 may also include an external control interface 236 and an external data communications interface 238 which are coupled, e.g., to the first network switch 105 of FIG. 1. Server 202 also includes control logic 240 which receives and responds to control commands received through external control interface 236. Control logic 236 may access processor cores 220, 222, 224, 226 (via control bus 242) and locations in memory 228, 230, 232, 234 on behalf of management node 102, other compute nodes 112, and other CU's 115A-C.

Illustratively, servers 204, 206 each include two processors 246, 248. In one embodiment, each processor 246, 248 may be a special purpose processor which includes a processing element 250, and a plurality of accelerator elements 252 (A), 254 (B), 256 (C), 258 (D), 260 (E), 262 (F), 264 (G), 266 (H). Each processor 246, 248 may have a dedicated memory 268, 270. However, in other embodiments, it is possible to have different memory organizations. For example, servers 204, 206 may include a memory which is shared by processors 246 and 248. Control and data for each of the processors 246, 248 may be received from server 202 via a respective I/O interface 210, 212.

In one embodiment, the processing element 246 may be a processor and/or a processing core that acts as a controller for the accelerator elements A-H. Accordingly, the processing element 246 may provide control for the accelerator elements A-H, perform operations such as memory allocation for the accelerator elements A-H, and enable communication between the general purpose processors 216, 218 and the accelerator elements A-H.

Each of the accelerator elements A-H may also be a processing core. In one embodiment, each accelerator element A-H may be configured to perform mathematically intensive operations such as double precision floating point computations and also perform operations on multiple data elements simultaneously (i.e. vector processing). The accelerator elements A-H may either work alone or work together. For example, in one embodiment, the accelerator elements A-H may be chained together so that the accelerator elements A-H can each handle a step of a complex operation. In another embodiment, data may be partitioned across the accelerator elements A-H so that the accelerator elements A-H can perform the same kind of operation in parallel.

Figure 3:
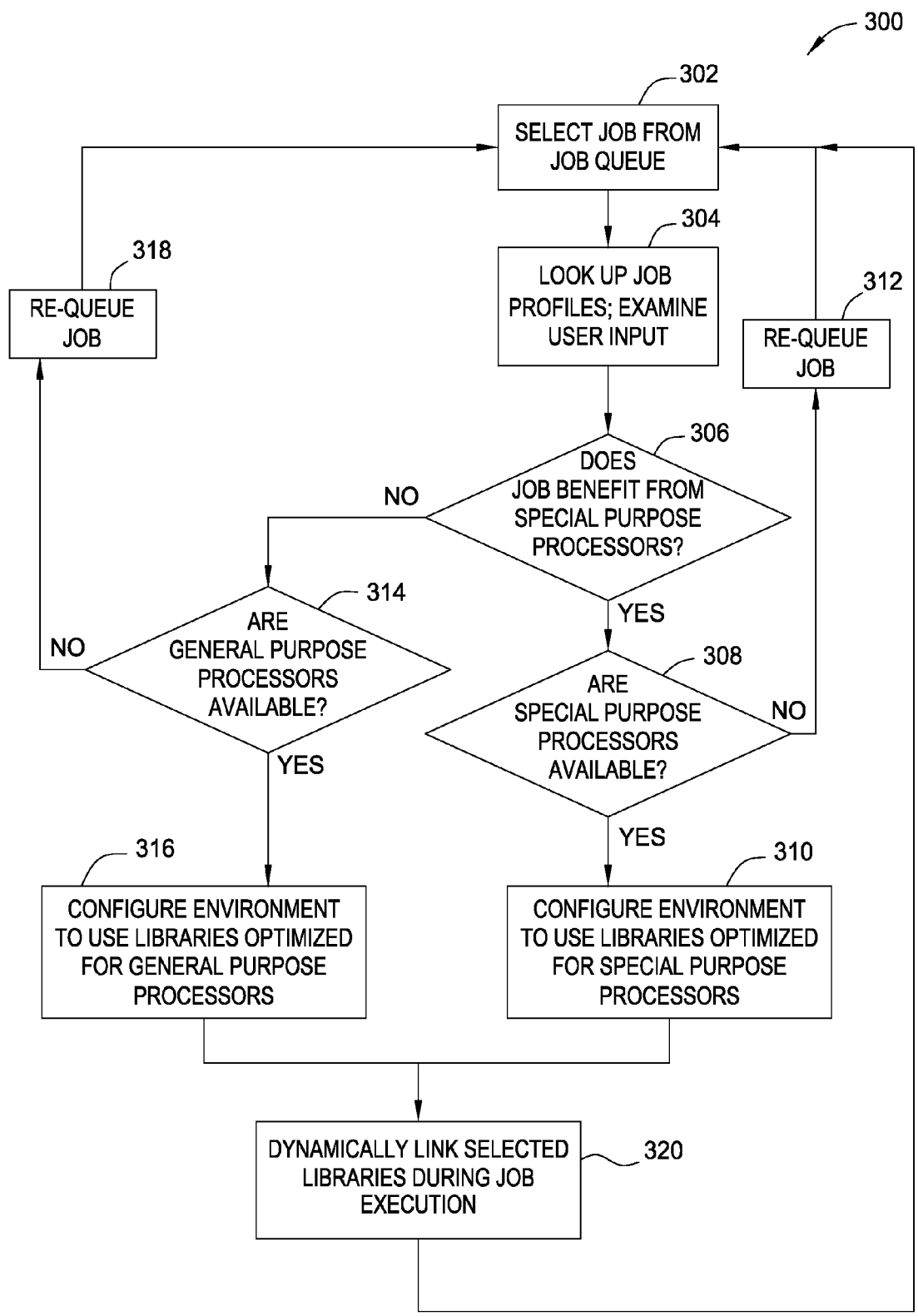
FIG. 3 is a flow diagram illustrating a method for determining a library to be linked with an application, according to one embodiment of the invention.

FIG. 3 is a flow diagram illustrating a method 300 for determining one or more libraries to be linked with an application, according to one embodiment of the invention. As shown, the method 300 begins at step 302 where a job is selected from the job queue 130 by the job scheduler 132. At step 304, the job scheduler 132 retrieves the job profiles 134 for the job and examines any user input provided for the job. Based on the job profiles 134 and/or the user input, the job scheduler 132, at step 306, may determine if the job may benefit from a special purpose processor (or at least benefits from at least one accelerator element of a special purpose processor). For example, the job scheduler 132 may determine, from examining the job profiles 134 of the job, that the job has historically executed more efficiently using a special purpose processor. In another example, user input may indicate that the job should be executed using a special purpose processor. In either case, at step 308, the job scheduler 132 determines if any special purpose processors are available. If so, then at step 310, the job scheduler 132 configures the environment of the job to use libraries optimized for special purpose processors. Examples of configuring a computing environment are provided below.

However, if the job scheduler 132 determines that no special purpose processors are available, then the job is re-queued at step 312. In another embodiment, the job scheduler 132 may schedule the job to execute on a general purpose processor if any are available.

Returning to step 306, if the job scheduler 132 determines that the job would not benefit from a special purpose processor, the job scheduler 132 may schedule the job for execution on a general purpose processor. Accordingly, at step 314, the job scheduler 132 determines if any general purpose processors are available. If the job scheduler 132 determines that general purpose processors are available, then the job scheduler 132, at step 316, configures the environment for the job to use libraries optimized for general purpose processors. However, if no general purpose processors are available, then the job is re-queued in the job queue 130 at step 318. In another embodiment, the job scheduler 132 may schedule the job to execute on compute nodes having special purpose processors if any are available.

Once the environment is configured to use a particular set of libraries (e.g. libraries optimized for general purpose processors or special purpose processors), the libraries are dynamically linked with the job during run-time. Accordingly, at step 320, during program execution, the job may link to routines from the particular libraries specified by the job scheduler. Similarly, the job may access the values of any environment variables (or rely on other aspects of the run-time computing environment) configured for the job by the job scheduler. That is, the job may execute in the computing environment configured based on a job profile associated with that job.

Figure 4A:
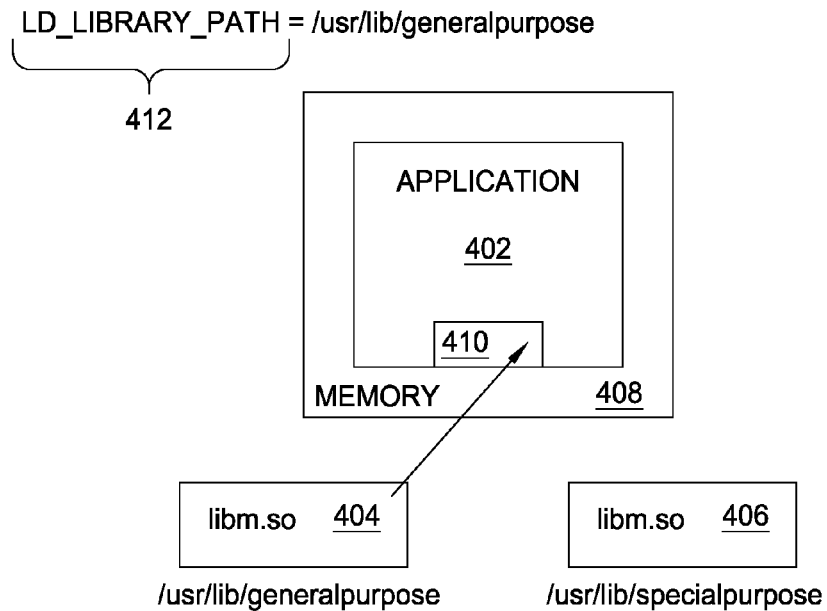
FIGS. 4A-4B illustrate examples of an application linking with a library, according to one embodiment of the invention.
Figure 4B:
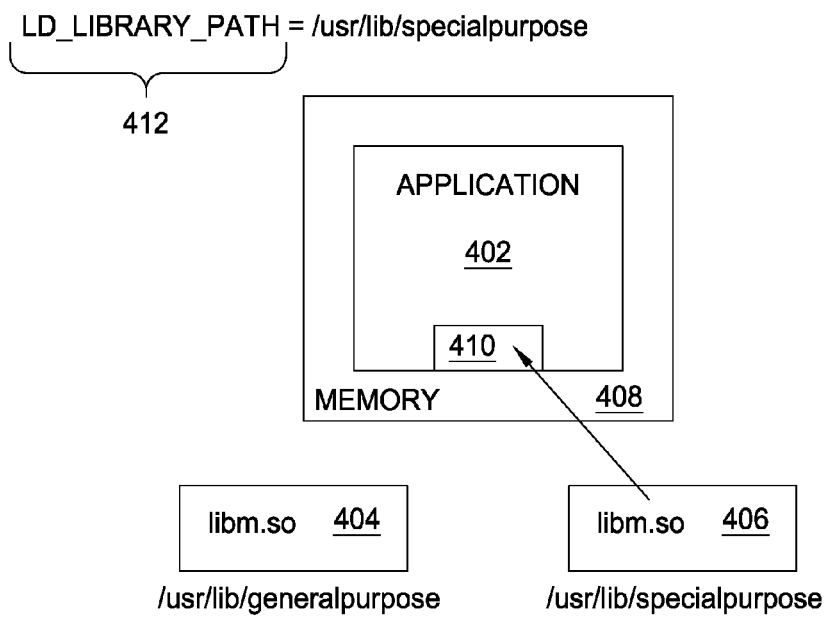

FIGS. 4A-4B illustrate examples of an application 402 linking with a library, according to an embodiment of the invention. Specifically, FIG. 4A illustrates an example of an application 402 linking with a library 404 optimized for a general purpose processor, and FIG. 4B illustrates an example of the application 402 linking with a library 406 optimized for a special purpose processor. As shown in FIG. 4A, an application 404 (i.e. a binary image or object file) that awaits execution is located in memory 408. The application 402 may include a stub 410 for each library (or library-routine) reference in the application 302. Of course, persons ordinarily skilled in the art know that the stub 410 may be a small piece of code that includes a reference to a routine provided by a library. During runtime, a linker may resolve the reference to the actual routine provided by the library.

During run-time, the stub 410 is executed and checks to see whether the needed library-routine is already in memory 408. If not, the application 402 loads the library-routine into memory 408 and replaces the stub 410 with the address of the routine and executes the routine. Using this approach may minimize disk space and memory usage, as opposed to using a static linking technique, where all the library routines used in the program are copied into the binary image.

When the application 402 loads into memory 408, the application 402 may search for the library in a location specified by an environment variable stored in an environment file. As shown, the environment variable LD_LIBRARY_PATH 412 is set to the following path: /usr/lib/generalpurpose. Accordingly, when the application 402 is executed, the stub 410 is replaced with the address of the routine located in /usr/lib/generalpurpose, which contains libraries optimized for general purpose processors. Illustratively, the library linked with the application 402 is a math library libm.so 404.

As stated, the library that an application links to during execution can vary. For example, the job scheduler 132 (as shown in FIG. 1) may determine that the application executes more efficiently using a library optimized for special purpose processors or simply that such compute nodes are available. In such a case, the computing environment is tailored so that the application links with this library. For example, the job scheduler 132 may specify the library to link with the application by modifying the library path variable of the environment file. As shown in FIG. 4B, LD_LIBRARY_PATH 412 has been modified so that it set to path /usr/lib/specialpurpose, which contains library routines optimized for special purpose processors. Accordingly, the math library libm.so 406 located in /usr/lib/specialpurpose is linked with application 402 during run-time instead of math library libm.so 404 located in /usr/lib/generalpurpose as illustrated in FIG. 4A.

Advantageously, as described herein, embodiments of the invention provide techniques to manage resources on a massively parallel computing system having a plurality of hybrid compute nodes. For example, a job scheduler may determine one or more libraries to link to an application, based on system and user requirements. In one embodiment, the libraries may provide optimizations directed towards a specific processor architecture. Once the library is determined, the job scheduler may configure the environment of the application so that the application links with the optimized library during run-time. Doing so may improve overall system performance of the massively parallel computing system.

While the foregoing is directed to embodiments of the present invention, other and further embodiments of the invention may be devised without departing from the basic scope thereof, and the scope thereof is determined by the claims that follow.

What is claimed is:

1. A computer-implemented method for configuring a computing environment to execute a computing job in a system having a plurality of compute nodes, each having at least a processor and a memory, the method comprising:
   determining one or more special purpose processors to use for processing the computing job, by evaluating a job profile associated with the computing job, wherein the job profile specifies historical performance data based on previous executions of the computing job on the plurality of compute nodes;
   selecting one or more compute nodes from the plurality of compute nodes for processing the computing job, based on the determined one or more special purpose processors;
   determining one or more libraries from a plurality of libraries for the computing job to link to when the computing job is executed by at least the one or more special purpose processors, wherein each of the plurality of libraries is optimized for a respective configuration of at least one of hardware and software components, and wherein the one or more libraries include one or more routines specifically configured for execution on the one or more special purpose processors; and
   configuring the computing environment such that the computing job executes on the one or more compute nodes using the one or more special purpose processors, and accesses the one or more routines from the determined one or more libraries, wherein each special purpose processor includes a plurality of accelerator elements configured to perform a vector processing operation, and wherein the one or more routines in the one or more libraries are configured to access the plurality of accelerator elements to perform the vector processing operation.

2. The computer-implemented method of claim 1, wherein configuring the computing environment includes setting a library path variable indicating a storage location of the determined libraries.

3. The computer-implemented method of claim 1, further comprising, determining, based on the evaluation of the job profile, one or more compute nodes, of the plurality, to execute the computing job.

4. The computer-implemented method of claim 1, wherein the special purpose processor is a vector-based processor.

5. The computer-implemented method of claim 1, further comprising, during execution of the computing job, dynamically linking to the determined library.

6. The computer-implemented method of claim 1, wherein configuring the computing environment further includes defining at least one environment variable accessed by the computing job during execution.

7. The computer-implemented method of claim 1, wherein the historical performance data comprises at least one of execution times for the computing job, libraries used when executing the computing job, and compute resources consumed when executing the computing job.

8. The computer-implemented method of claim 1, wherein the job profile includes a requested configuration of the computing environment in which to execute the computing job.

9. The computer-implemented method of claim 1, further comprising:
   upon determining that no special purpose processors in the plurality of compute nodes are currently available, queuing the computing job until at least one special purpose processor is available.

10. A non-transitory computer-readable storage-medium containing a program which, when executed, performs an operation for configuring a computing environment to execute a computing job, the operation comprising:
   determining one or more special purpose processors to use for processing the computing job, by evaluating a job profile associated with the computing job, wherein the job profile specifies historical performance data based on previous executions of the computing job on the plurality of compute nodes;

selecting one or more compute nodes from the plurality of compute nodes for processing the computing job, based on the determined one or more special purpose processors;

determining one or more libraries from a plurality of libraries for the computing job to link to when the computing job is executed by at least the one or more special purpose processors, wherein each of the plurality of libraries is optimized for a respective configuration of at least one of hardware and software components, and wherein the one or more libraries include one or more routines specifically configured for execution on the one or more special purpose processors; and configuring the computing environment such that the computing job executes on the one or more compute nodes using the one or more special purpose processors, and accesses the one or more routines from the determined one or more libraries, wherein each special purpose processor includes a plurality of accelerator elements configured to perform vector processing operations and wherein one or more of the routines in one or more of the libraries are configured to access the plurality of accelerator elements to perform the vector processing operation.

11. The computer-readable storage-medium of claim 10, wherein configuring the computing environment includes setting a library path variable indicating a storage location of the determined libraries.

12. The computer-readable storage-medium of claim 10, wherein the operation further comprises, determining, based on the evaluation of the job profile, one or more compute nodes, of the plurality, to execute the computing job.

13. The computer-readable storage-medium of claim 10, wherein the computing job dynamically links to the determined libraries during execution of the computing job.

14. The computer-readable storage-medium of claim 10, wherein configuring the computing environment further includes defining at least one environment variable accessed by the computing job during execution.

15. The computer-readable storage-medium of claim 10, wherein the historical performance data comprises at least one of execution times for the computing job, libraries used when executing the computing job, and compute resources consumed when executing the computing job.

16. The computer-readable storage-medium of claim 10, wherein the job profile includes a requested configuration of the computing environment in which to execute the computing job.

17. A computing system, comprising:
a computing environment which includes a plurality of compute nodes, each including at least a processor and a memory; and
a job scheduler configured to select a computing job to execute on at least some of the plurality of compute nodes, wherein the job scheduler is configured to perform an operation for configuring the computing environment to execute the computing job, the operation comprising:
determining one or more special purpose processors to use for processing the computing job, by evaluating a job profile associated with the computing job, wherein the job profile specifies historical performance data based on previous executions of the computing job on the plurality of compute nodes;
selecting one or more compute nodes from the plurality of compute nodes for processing the computing job, based on the determined one or more special purpose processors;
determining one or more libraries from a plurality of libraries for the computing job to link to when the computing job is executed by at least the one or more special purpose processors wherein each of the plurality of libraries is optimized for a respective configuration of at least one of hardware and software components, and wherein the one or more libraries include one or more routines specifically configured for execution on the one or more special purpose processors; and
configuring the computing environment such that the computing job executes on the one or more compute nodes using the one or more special purpose processors, and accesses the one or more routines from the determined one or more libraries, wherein each special purpose processor includes a plurality of accelerator elements configured to perform a vector processing operation, and wherein the one or more routines in the one or more libraries are configured to access the plurality of accelerator elements to perform the vector processing operation.

18. The system of claim 17, wherein configuring the computing environment includes setting a library path variable indicating a storage location of the determined libraries.

19. The system of claim 17, wherein the operation performed by the job scheduler further includes, determining, based on the evaluation of the job profile, one or more compute nodes, of the plurality, to execute the computing job.

20. The system of claim 17, wherein the computing job dynamically links to the determined libraries during execution of the computing job.

21. The system of claim 17, wherein configuring the computing environment further includes defining at least one environment variable accessed by the computing job during execution of the computing job.

22. The system of claim 17, wherein the historical performance data comprises at least one of execution times for the computing job, libraries used when executing the computing job, and compute resources consumed when executing the computing job.

23. The system of claim 17, wherein the job profile includes a requested configuration of the computing environment in which to execute the computing job.

* * * * *